(12) United States Patent
Chaki et al.

(10) Patent No.: US 12,418,801 B2
(45) Date of Patent: Sep. 16, 2025

(54) FACILITATING INTERFERENCE AVOIDANCE AT COEXISTENCE OF CELLULAR RADIO ACCESS TECHNOLOGIES IN A SAME CHANNEL

(71) Applicant: AT&T Intellectual Property I, L.P., Atlanta, GA (US)

(72) Inventors: Tarun Chaki, Morganville, NJ (US); Nicholas Arconati, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 585 days.

(21) Appl. No.: 17/735,229

(22) Filed: May 3, 2022

(65) Prior Publication Data

US 2023/0362660 A1 Nov. 9, 2023

(51) Int. Cl.
*H04W 16/14* (2009.01)
*H04W 28/26* (2009.01)
*H04W 72/0453* (2023.01)
*H04W 72/541* (2023.01)

(52) U.S. Cl.
CPC ........... *H04W 16/14* (2013.01); *H04W 28/26* (2013.01); *H04W 72/0453* (2013.01); *H04W 72/541* (2023.01)

(58) Field of Classification Search
CPC . H04W 16/14; H04W 28/26; H04W 72/0453; H04W 72/541
USPC .......................................................... 370/329
See application file for complete search history.

(56) References Cited

U.S. PATENT DOCUMENTS

| | | | |
|---|---|---|---|
| 2015/0208253 A1* | 7/2015 | Kim | H04L 27/2614 370/252 |
| 2015/0296484 A1* | 10/2015 | Ekberg | H04W 64/003 370/329 |
| 2018/0132125 A1* | 5/2018 | Li | H04W 24/10 |
| 2019/0089498 A1* | 3/2019 | Pelletier | H04L 5/005 |
| 2019/0296881 A1* | 9/2019 | Ang | H04W 72/0446 |

\* cited by examiner

*Primary Examiner* — Mang Hang Yeung

(57) ABSTRACT

Facilitating interference avoidance at coexistence of cellular radio access technologies in same channel is provided herein. Operations of a system include evaluating respective traffic signals received from a group of equipment operating in a defined area. The evaluating comprises determining that the first group of equipment and the second group of equipment utilize an overlapping portion of a radio frequency spectrum. The operations can also include, based on a determination that an interference level of the overlapping portion of the radio frequency spectrum satisfies a defined interference level, reserving, by the system, the overlapping portion of the radio frequency spectrum for usage by the first group of equipment.

20 Claims, 10 Drawing Sheets

FACILITATING INTERFERENCE AVOIDANCE AT COEXISTENCE OF CELLULAR RADIO ACCESS TECHNOLOGIES IN A SAME CHANNEL

TECHNICAL FIELD

This disclosure relates generally to the field of network configuration and, more specifically, to facilitating interference avoidance in a radio frequency spectrum caused by devices utilizing different communication protocols, e.g., in fifth generation (5G), or new radio, networks, or other advanced networks.

BACKGROUND

Due to the shortage and high cost of radio spectrum, new generations of communication technology might want to repurpose the spectra used in the older generations. However, with such repurposing, the older devices still in use might suffer from poor performance due to interference caused by other devices running with overlapping frequencies. Accordingly, unique challenges exist associated with network configuration and interference avoidance in advanced networks.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Due to the shortage and high cost of radio spectrum, new generations of communication technology might want to repurpose the spectra used in the older generations. However, with such repurposing, the older devices still in use could suffer from poor performance due to interference caused by other devices running with overlapping frequencies.

Figure 1:
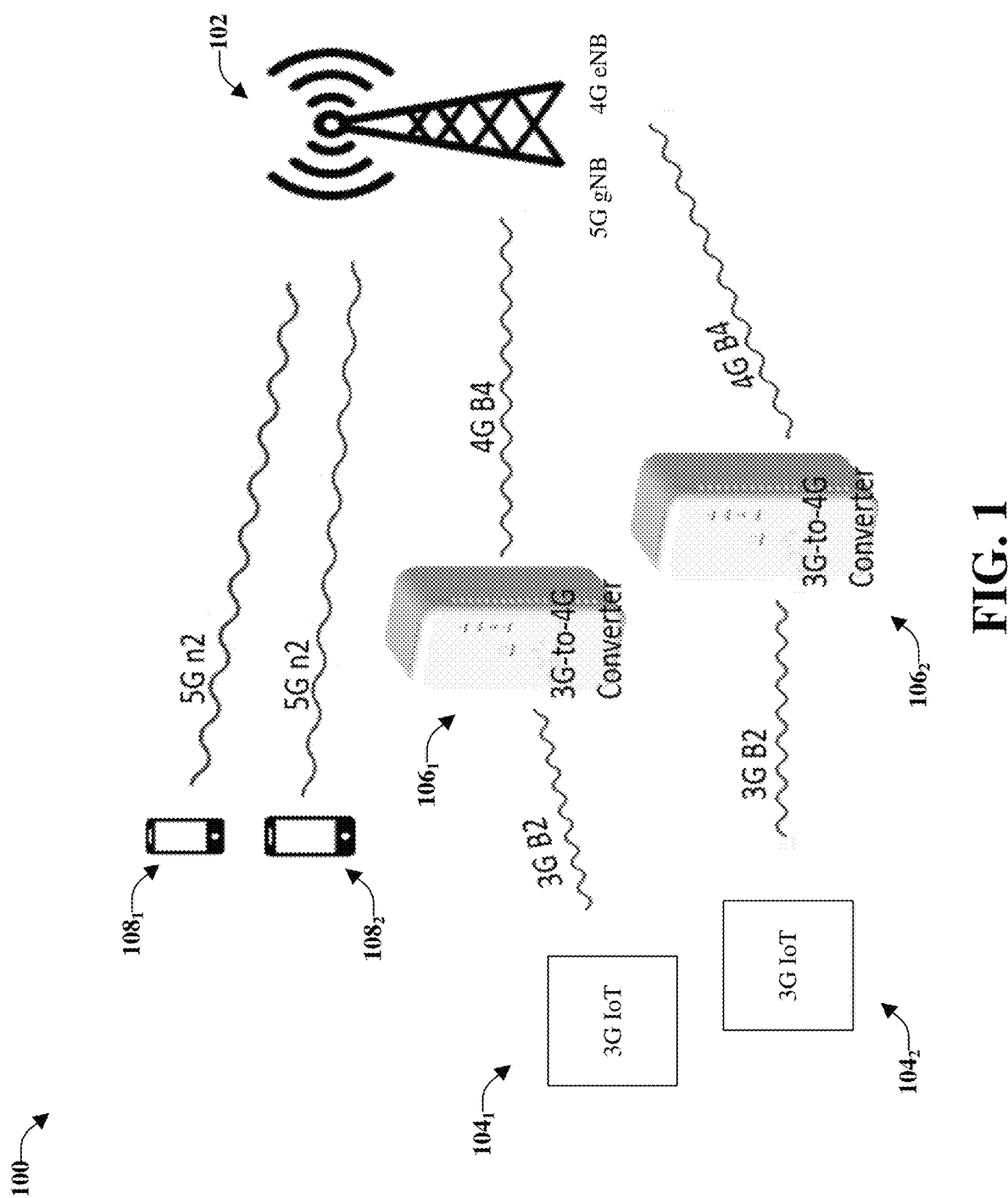
FIG. 1 illustrates an example, non-limiting, schematic representation of a communication network that includes various equipment that can operate in at least a same portion of a radio frequency spectrum according to one or more embodiments.

For example, FIG. 1 illustrates an example, non-limiting, schematic representation of a communication network 100 that includes various equipment that can operate in at least a same portion of a radio frequency spectrum according to one or more embodiments.

As illustrated, network equipment 102 can facilitate communication by a multitude of user equipment. As illustrated, the network equipment 102 can be configured to operate as a 5G gNB and/or a fourth Generation (4G) eNB. Some user equipment, identified as third generation (3G) equipment $104_1$ and $104_2$, can be legacy equipment that utilizes, for example, a 3G communication protocol (e.g., B2 frequency, such as 1900 Mega Hertz (MHz)). Further, other user equipment, such as the illustrated 3G-to-4G converters (identified as converters $106_1$ and $106_2$) can be configured to utilize a 4G communication protocol (e.g., B4 frequency, such as 1700 MHz). Further, other user equipment that communicates with the network equipment 102 can be one or more 5G equipment, identified as 5G equipment $108_1$ and $108_2$, can be configured to utilize at least 5G communication protocol and/or a new radio communication protocol (e.g., n2 NR band, such as 1900 MHz). It is noted that although only two of each type of equipment (e.g., the 3G equipment $104_1$ and $104_2$, the converters $106_1$, and the $106_2$, 5G equipment $108_1$ and $108_2$) are shown and described, the disclosed embodiments are not limited to this implementation. Instead, fewer or more than two of each type of equipment can be included in the communication network 100.

New generations of mobile technology, such as 3G, 4G, 5G, sixth generation (6G), new radio (NR), and so on are introduced fairly frequently (e.g., every few years, each decade, or at another time interval). Additionally, some major cellular networks have decided to shut down 3G networks, thereby making 3G spectrum available for repurposing in 5G networks.

Multitudes of Internet of Things (IoT) equipment or Internet of Everything (IoE) equipment (e.g., the 3G equipment $104_1$ and $104_2$), such as alarms, meters, and so on, are currently using 3G radio technology. These devices might not be easily replaced and, thus, will continue to operate in 3G mode, at least for the short term. One plan is to attach these 3G devices (e.g., the 3G equipment $104_1$ and $104_2$) to femtocell converters (e.g., the converters $106_1$ and $106_2$), which connect 3G devices to 4G macro-cell towers (e.g., the network equipment 102). Thus, the alerts generated by 3G alarm devices can be sent to a server connected to a network configured to operate utilizing a 4G communication protocol. An issue that can be experienced in this situation is that nearby 5G devices (e.g., the 5G equipment $108_1$ and $108_2$) using repurposed spectrum can cause signal interference to the 3G devices communicating with femtocells.

Initially (before repurposing of the spectrum), due to close geographic proximity with the femtocells (e.g., the converter), the 3G devices will use low transmission power and do not cause interference with other devices. Upon or after activating a 5G network in the same band, the link between 3G devices and the converter (B2) will experience interference for the 5G signal (n2). Thus, the 3G devices will increase their power level in order to improve (or maintain) SINR (Signal-to-Interference and Noise Ratio), as more 5G devices are activated within the network. The increased power level in 3G devices will produce stronger signals and cause interference with 5G devices, which will in turn increase power levels of the 5G devices also. Thus, there may be mutual signal interference between devices of the older and newer generations (e.g., both the 5G devices and other 3G IoTs will be negatively affected). In addition, alerts transmitted by simple alarm devices (often of older generations) may be buried in noise and could be lost, causing denial of service or other negative consequences.

Thus, 3G devices connected to different femtocells may also interfere with one another if their power levels are high. An optimized power level in 3G devices may not be reached, as the maximum power level in the femtocell may be restricted to a low value. The amount of interference on a 3G device is additive with the number of nearby 5G and 3G devices. If SINR becomes too low due to interferences, the alerts generated by 3G devices may not be read, thereby causing a denial of service (DoS) for 3G alarms, which could be intended for life-saving fire alarms or other types of critical equipment.

By way of example and not-limitation, each 3G IoT (e.g., the 3G equipment $104_1$ and $104_2$) can camp to a designated converter femtocell (e.g., the converters $106_1$ and $106_2$) in its close proximity. No handover is allowed. In this example, suppose $i^{th}$ 3G IoT camps to $k^{th}$ femtocell. The uplink signal at $k^{th}$ femtocell would be:

$$S^k = c_i^k + \Sigma_j u_j + \Sigma_{m \neq i} c_m^k \qquad \text{Equation 1.}$$

where $u_j$ is the signal due to $j^{th}$ 5G UE and $c_m^k$ is the signal due to $m^{th}$ 3G IoT at $k^{th}$ femtocell. The 3G device continuously monitors various parameters including, but not limited to, RSRP (Reference Signal Received Power), RSRQ (Reference Signal Received Quality), and SINR (Signal-to-Interference and Noise Ratio).

Due to mutual interaction of interferences, the transmission power level at 3G IoT may become uncontrollable. A procedure for power control loop can be run at the femtocell to find an optimum power level. If there is heavy, bursty traffic from many 5G UE's, the femtocell may not be able to optimize its power level, which can reach the maximum limit. Further, SINR at 3G IoT can be low due to interferences from surrounding devices. The alerts can become unreadable, causing a denial of service. It is noted that the amount of the interference is directly proportional to the number of devices (5G and 3G).

To mitigate these issues, as well as other issues, described herein are systems, methods, articles of manufacture, and other embodiments or implementations that can facilitate mitigation of interference caused by overlapping spectrum utilizing a Bandwidth Part (BWP), which has been introduced in the 5G standard of 3GPP. The BWP is a contiguous set of physical resource blocks (PRBs) on a defined carrier. These PRBs are selected from a contiguous subset of the common resource blocks, which are denoted as BWP. The BWP can reduce power consumption of 5G NR devices. Thus, the BWP is a part of the resource blocks in the frequency-time domain, which can be utilized with the disclosed embodiments. Accordingly, as discussed herein, the 5G network can be configured to transmit only in a part of the spectrum bandwidth available to it, leaving unused a small segment of frequencies, which 3G has been using.

Based on various parameters, the 5G devices will operate (transmit and receive) in a designated section of the bandwidth, instead of utilizing the whole bandwidth. The unused segment corresponds to frequencies utilized by older generations of equipment. Thus, with proper allocation of BWP, there will not be mutual interference among the devices of different generations. Further, according to some implementations, a machine learning algorithm executing in the network equipment (e.g., a 5G gNB) can continually (or based on defined time intervals) assess the interference level and decide to introduce and/or remove BWP configuration in gNB.

It is noted that although various embodiments are discussed with respect to 3G equipment, the disclosed aspects are not limited to this implementation. For example, in some embodiments there can be overlapping C-Band (3.3-4.2 GHz) between 5G terrestrial and 4G LTE satellite communication. The satellite signal received at the earth station is usually several orders of magnitude weaker than the cellular signals and can be drowned in noise if a macro 5G tower is located in proximity to the earth station. If the overlapping frequency part causing interference to the earth station is known, the technique of BWP can be used to block transmission from 5G tower in that frequency range as discussed herein. This can reduce and/or mitigate the interference issue in the satellite communication.

Figure 2:
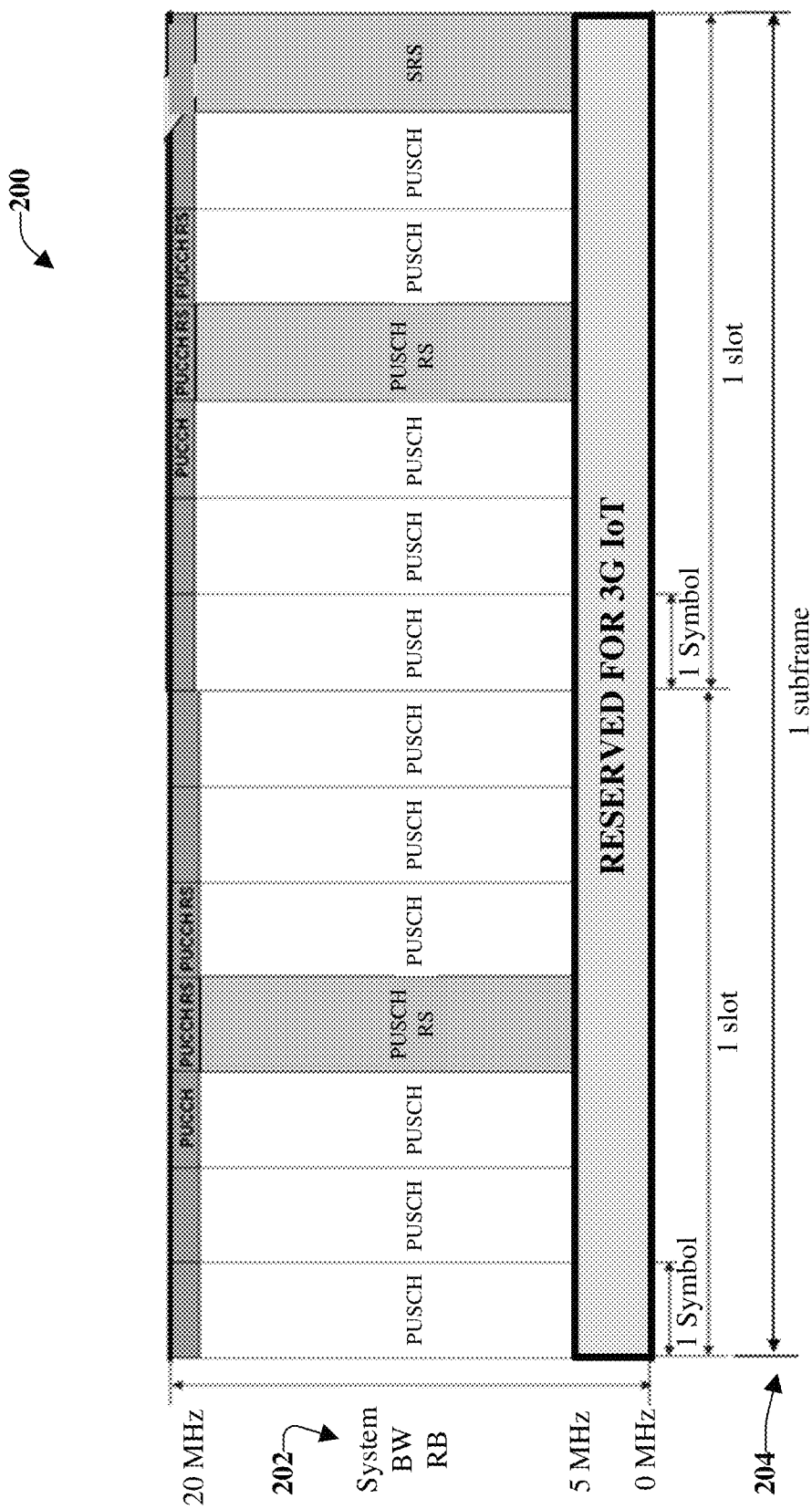
FIG. 2 illustrates an example, non-limiting, schematic representation of a spectrum of interest in accordance with one or more embodiments.

In further detail, FIG. 2 illustrates an example, non-limiting, schematic representation of a spectrum of interest 200 in accordance with one or more embodiments. Illustrated on the vertical axis is system bandwidth 202 and a single subframe 204 is illustrated on the horizontal axis.

According to a non-limiting example, suppose a 5G cell is operating with a spectrum of 20 MHz bandwidth (indicated along the vertical axis). In this example, the 3G UMTS has a fixed 5 MHz bandwidth. With 15 kHz carrier subspacing, 5G will have 100 resource blocks in the frequency-time domain. However, according to the embodiments provided herein, 5G will be configured (BWP enabled) to transmit only in the 25-99 resource blocks. 3G devices will transmit in 5 MHz spectrum (as indicated in the section marked Reserved for 3G IoT), which will correspond to 0-24 resource blocks of 5G spectrum. In other words, the repurposed 5G spectrum does not use the 5 MHz at the bottom of the band, but can use the remainder of the resource blocks and the 3G UMTS WCDMA uses the fixed channel bandwidth of 5 MHz. With this frequency allocation of 5G spectrum, there will not be any mutual signal interference, as 5G and 3G devices will transmit in non-overlapping frequency ranges. Thus, the disclosed embodiments can mitigate the adverse effects of mutual interference between 5G and older devices.

Figure 3:
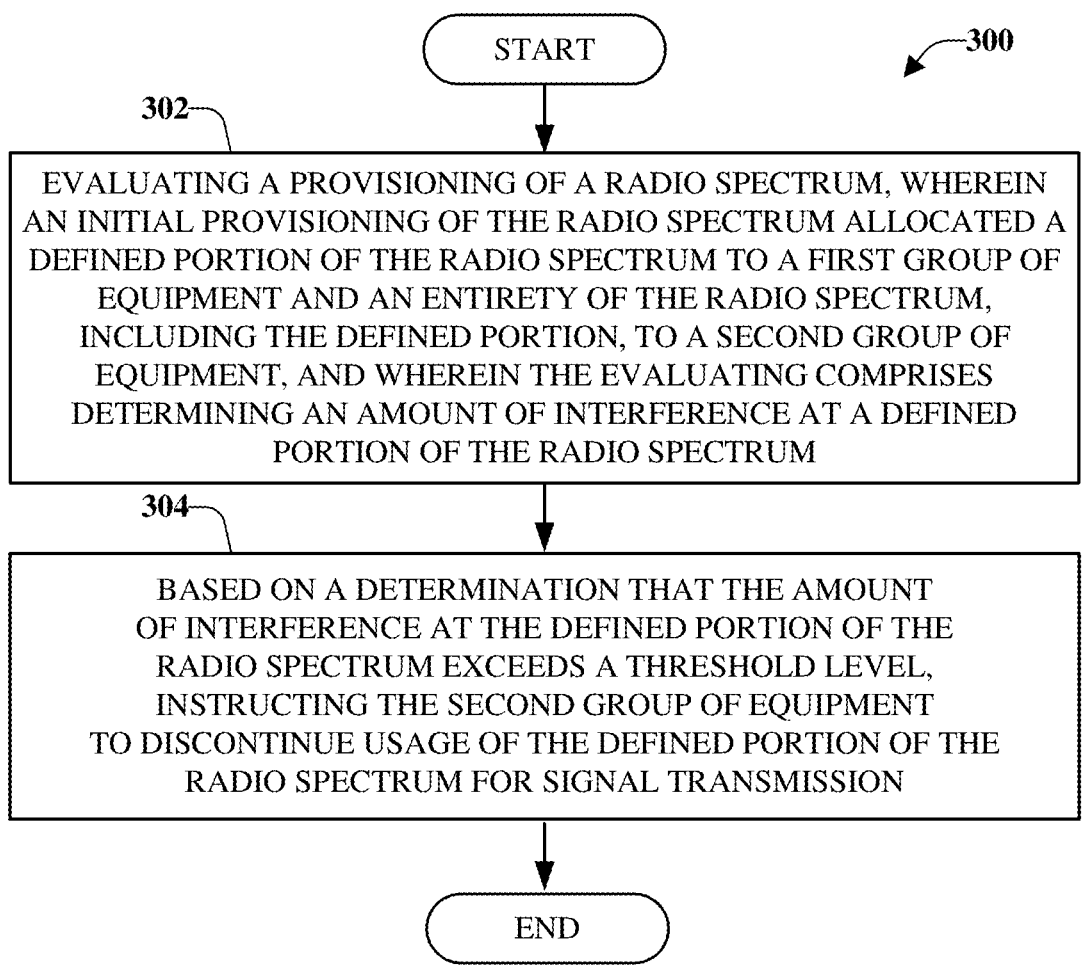
FIG. 3 illustrates an example, non-limiting, computer-implemented method for facilitating interference avoidance at coexistence of cellular radio access technologies in a same channel in accordance with one or more embodiments described herein.

FIG. 3 illustrates an example, non-limiting, computer-implemented method 300 for facilitating interference avoidance at coexistence of cellular radio access technologies in a same channel in accordance with one or more embodiments described herein. The computer-implemented method 300 can be implemented by a system including a memory and a processor, network equipment including a memory and a processor, a network controller including a memory and a processor, or another computer-implemented device including a memory and a processor.

The computer-implemented method 300 begins, at 302, when a repurposing of a radio spectrum is evaluated. A portion of the electromagnetic (EM) spectrum, referred to as the radio frequency (RF) spectrum (or simply the radio spectrum) enables wireless communication. The RF spectrum is divided into multiple frequency bands, some of which are used for wireless communication as well as bands that include visible light, X-rays, and so on. There is a finite amount of frequency bands as well as limitations on their usage. Further, some of the frequency bands are in high demand because such bands enable a greater amount of data communication and/or might allow signals to penetrate further than other bands. The bands used for wireless communication are in high demand, which is compounded by the use of equipment classified as IoT equipment or IoE equipment.

As it relates to wireless communications, different types of equipment are configured to operate according to different communication protocols. For example, equipment that is configured to operate according to a 3G communication protocol or a 4G communication protocol can use a portion of the RF spectrum that is also utilized by equipment that is configured to operate according to a NR communication protocol, a 5G protocol, or more advanced communication protocols.

Thus, the RF spectrum can be provisioned such that a defined portion of the radio spectrum can be allocated to a first group of equipment and, further, an entirety of the RF spectrum under consideration can be allocated to a second group of equipment. For example, the first group of equipment can include equipment that utilizes a first communication protocol (a 3G communication protocol, a 4G protocol, or another legacy protocol). Further, the second group of equipment includes equipment that utilizes a second communication protocol, different from the first communication protocol. For example, the second communication protocol can be a NR communication protocol, a 5G communication protocol, and/or other advanced communication protocols.

According to some implementations, more than two groups of equipment can be allocated to the RF spectrum under consideration. For example, a first group of equipment can operate according to a 3G communication protocol, a second group of equipment can operate according to a 5G communication protocol or a NR communication protocol, a third group of equipment can operate according to a 4G communication protocol, and so on.

The first group of equipment and/or the third group of equipment can utilize respective defined portions of the RF spectrum and the second group of equipment can utilize an entirety of the RF spectrum under consideration. Thus, interference can be caused in the defined portion of the RF spectrum since all the devices (e.g., the first group, the second group, and the third group) can utilize overlapping portions of the RF spectrum.

The 3G equipment (B2) and the 5G equipment (n2) can utilize a same portion (e.g., a defined portion) of the RF spectrum and, therefore, can cause interference to one another. Therefore, the evaluation of the RF allocation can include determining an amount of interference at a defined portion (or multiple defined portions) of the RF spectrum. If it is determined that the amount of spectrum exceeds a threshold level, at 104, the second group of equipment (e.g., the 5G equipment) can be instructed to discontinue usage of the defined portion(s) of the RF spectrum for signal transmission. Thus, the 5G equipment, in this example, can utilize the other portions of the RF spectrum while avoiding usage of the defined portion reserved for the 3G equipment.

After a defined interval, the repurposing of the RF spectrum can be reevaluated. If the amount of interference detected continues to exceed the threshold level, no action is taken. However, if the amount of interference detected no longer exceeds the threshold level (or is not expected to exceed the threshold level), the repurposing of the radio spectrum can be reinstated. Thus, the 5G equipment can resume utilization of the defined portion of the RF spectrum as well as utilization of the other portions of the RF spectrum.

Figure 4:
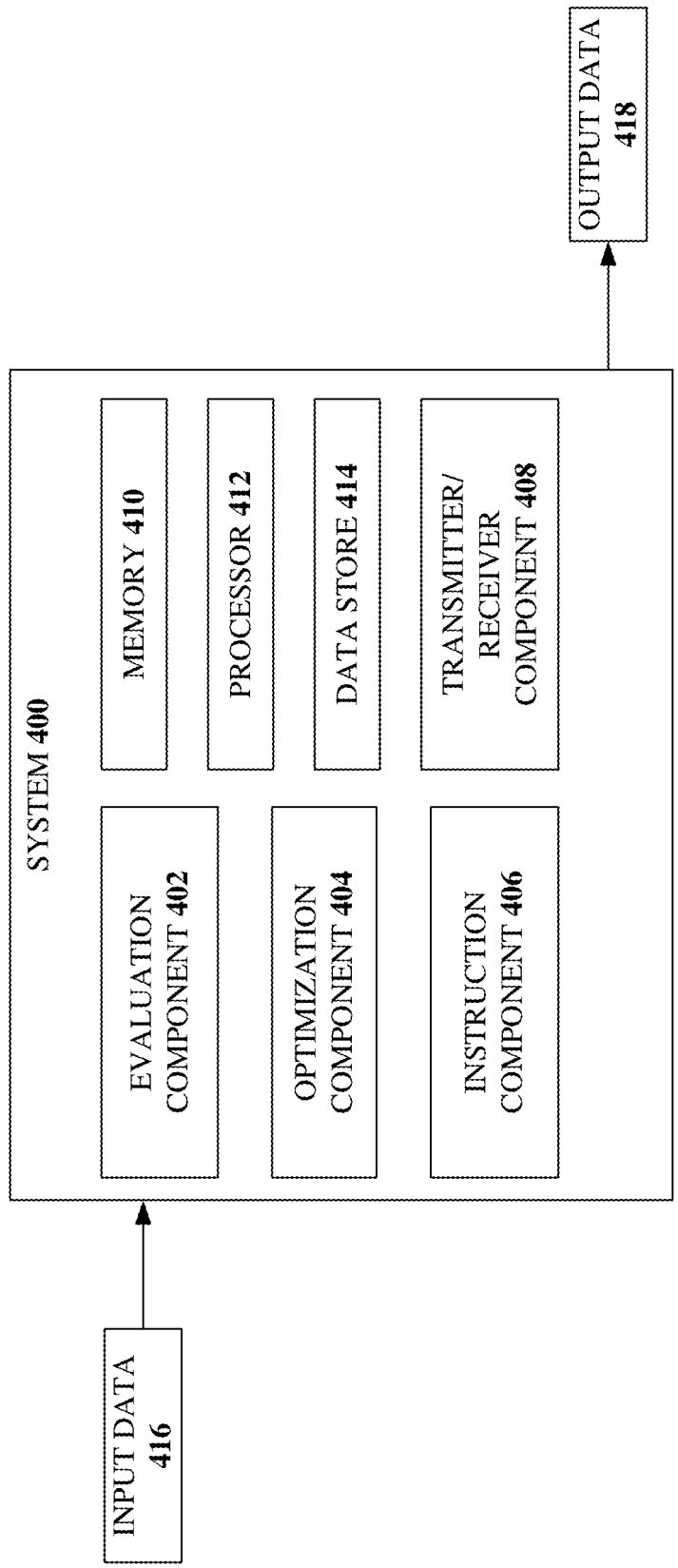
FIG. 4 illustrates an example, non-limiting, system that facilitates repurposing at least a portion of a radio frequency spectrum to mitigate an amount of interference within a communications network in accordance with one or more embodiments described herein.

FIG. 4 illustrates an example, non-limiting, system 400 that facilitates repurposing at least a portion of a RF spectrum to mitigate an amount of interference within a communications network in accordance with one or more embodiments described herein. Repetitive description of like elements employed in other embodiments described herein is omitted for sake of brevity. The system 400 can be configured to perform functions associated with the computer-implemented method 300 of FIG. 3, other systems, other processes, and/or other computer-implemented methods discussed herein.

Aspects of systems (e.g., the system 400 and the like), apparatuses, and/or processes (e.g., computer-implemented methods) explained in this disclosure can include machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described. In various embodiments, the system 400 can be any type of component, machine, device, facility, apparatus, and/or instrument that can include a processor and/or can be capable of effective and/or operative communication with a wired and/or wireless network.

The system 400 can include an evaluation component 402, an optimization component 404, an instruction component 406, a transmitter/receiver component 408, at least one memory 410, at least one processor 412, and at least one data store 414. In various embodiments, one or more of: the evaluation component 402, the optimization component 404, the instruction component 406, the transmitter/receiver component 408, the at least one memory 410, the at least one processor 412, and the at least one data store 414, can be electrically and/or communicatively coupled to one another to perform one or more of the functions of the system 400. In some embodiments, one or more of: the evaluation component 402, the optimization component 404, the instruction component 406, and the transmitter/receiver component 408 can include software instructions stored on the at least one memory 410 and/or the at least one data store 414 and executed by the at least one processor 412. The system 400 may also interact with other hardware and/or software components not depicted in FIG. 4.

The system 400 can receive (via the transmitter/receiver component 408) input data 416 that includes at least information indicative of an amount of interference in a defined portion of the radio frequency spectrum. For example, the information indicative of the amount of interference can be derived based on various signals received from the equipment in the network (e.g., 3G equipment). The signals can include one or more signals related to RSRP, RSRQ, SINR, and/or other types of signals.

Based on the input data 416, the evaluation component 402 can determine that an amount of interference in a RF spectrum (e.g., a portion of the RF spectrum of interest) satisfies a defined interference level based on a portion of resource blocks of the RF spectrum being provisioned to a first group of equipment and a second group of equipment. The first group of equipment can be configured to operate according to a first communication protocol and the second group of equipment can be configured to operate according to a second communication protocol. In an example, non-limiting implementation, the first communication protocol can be a 3G communication protocol and the second communication protocol can be a 5G communication protocol. However, it is noted that the disclosed embodiments are not limited to this implementation and other types of communication protocol can be utilized with the disclosed embodiments.

According to some implementations, the portion of resource blocks of the RF spectrum is a first portion of resource blocks of the radio frequency spectrum. Further, a second portion of resource blocks of the RF spectrum is provisioned to the second group of equipment. Thus, the first portion is provisioned for both the first group of equipment and the second group of equipment (e.g., is repurposed) while the second portion of resource blocks are provisioned for only the second group of equipment.

Based on the determination by the evaluation component 402 that the amount of interference satisfies the defined interference level, the optimization component 404 can restrict the portion of resource blocks for utilization by the first group of equipment. Information indicative of the restriction can be output (via the transmitter/receiver component 408) as output data 418. To restrict the usage, the instruction component 406 can transmit information to the second group of equipment that includes instructions to avoid transmission of traffic in the portion of resource blocks. In some implementations, the instruction component 406 can instruct the second group of equipment to discontinue utilization of the first portion of resource blocks.

Upon or after a defined interval, the evaluation component 402 can reevaluate the amount of interference in the radio frequency spectrum. If the amount of interference is determined to continue to satisfy the defined interference level, the restriction of the portion of resource blocks for utilization by the first group of equipment is continued to be implemented by the optimization component 404. However, if the amount of interference is determined to no longer satisfy the defined interference level (or expected to no longer satisfy the defined interference level), the optimization component 404 can remove the restriction of the portion of resource blocks. Thus, the portion of resource blocks can be enabled in order to be repurposed for utilization by the first group of equipment and the second group of equipment.

The 5G gNB (e.g., the network equipment 102, the system 400, other equipment, other systems, and so on) can continually monitor SINR and perform spectrum analysis, through which one or more signals from 3G and/or 4G devices operating nearby with overlapping spectrum can be detected. The system 400 can also arrange to receive SINR, RSRP and RSRQ data from 3G and/or 4G devices. In some implementations, a machine learning process can be executing in the gNB to analyze the data and determine when the interference is excessive. Depending on the decision, gNB can introduce or remove BWP configuration.

An advantage of the disclosed embodiments is that, with the introduction of 5G, there will be an increasing number of 5G IoT devices, but will not cause interference with the operation of existing 3G alarm devices and LTE satellite communication. The growth of machine-to-machine communication in 5G over coming years is predictive and can benefit from the disclosed embodiments. In addition, the various embodiments discussed herein can enable co-existence of 5G and other radio technologies.

With continuing reference to FIG. 4, the at least one memory 410 can be operatively connected to the at least one processor 412. The at least one memory 410 and/or the at least one data store 414 can store executable instructions that, when executed by the at least one processor 412 can facilitate performance of operations. Further, the at least one processor 412 can be utilized to execute computer executable components stored in the at least one memory 410 and/or the at least one data store 414.

For example, the at least one memory 410 can store protocols associated with mitigation of interference in a RF spectrum as discussed herein. Further, the at least one memory 410 can facilitate action to control communication between the system 400, other systems, equipment, network equipment, and/or user equipment such that the system 400 can employ stored protocols and/or processes to facilitate interference mitigation as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 412 can facilitate interference mitigation as discussed herein. The at least one processor 412 can be a processor dedicated to analyzing and/or generating information received, a processor that controls one or more components of the system 400, and/or a processor that both analyzes and generates information received and controls one or more components of the system 400.

Figure 5:
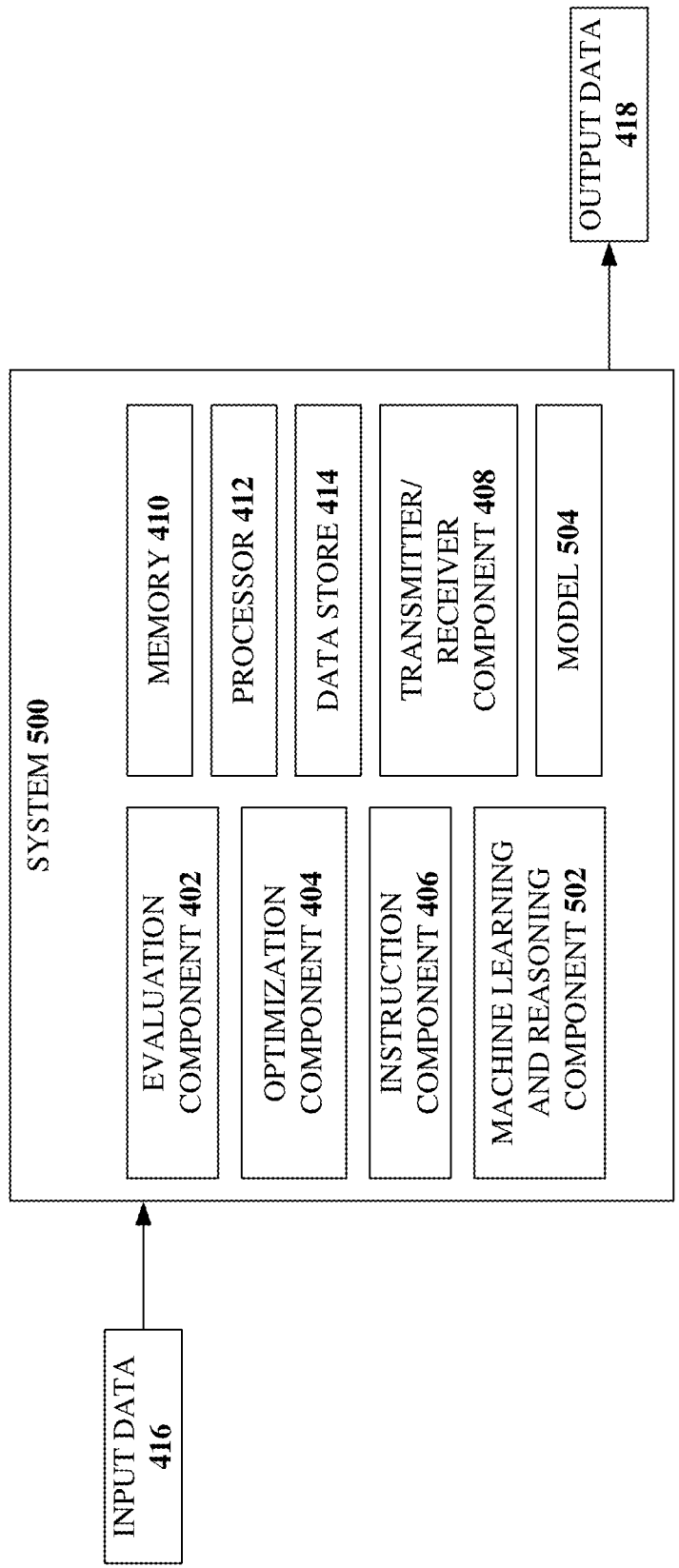
FIG. 5 illustrates an example, non-limiting, system that employs automated learning that trains a model to facilitate one or more of the disclosed aspects in accordance with one or more embodiments described herein.

FIG. 5 illustrates an example, non-limiting, system 500 that employs automated learning that trains a model to facilitate one or more of the disclosed aspects in accordance with one or more embodiments described herein. Repetitive description of like elements employed in other embodiments described herein is omitted for sake of brevity. The system 500 can comprise one or more of the components and/or functionality of the system 400 and vice versa.

The system 500 can utilize machine learning to train a model to identify an opportunity to reprovision one or more overlapping portions of an RF spectrum. The model can be trained to a defined confidence level. As illustrated, the system 500 can comprise a machine learning and reasoning component 502 that can be utilized to automate one or more of the disclosed aspects based on training a model 504. The machine learning and reasoning component 502 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 can employ principles of probabilistic and decision theoretic inference. Additionally, or alternatively, the machine learning and reasoning component 502 can rely on predictive models (e.g., the model 504) constructed using automated learning and/or automated learning procedures. Logic-centric inference can also be employed separately or in conjunction with probabilistic methods.

The machine learning and reasoning component 502 can infer whether at least a portion of a RF spectrum, initially utilized for a first set of equipment, is being repurposed for a second set of equipment. For example, the first set of equipment can be 3G equipment and the second set of equipment can be 5G equipment. Based on this determination, the machine learning and reasoning component 502 can determine whether an amount of interference caused by the repurposing of that portion of the spectrum is at or above a defined interference level by obtaining information indicative of the respective amounts of interference being experienced and reported by the one or more equipment. Based on this knowledge, the machine learning and reasoning component 502 can make an inference based on when to activate a restriction (e.g., a BWP) on the defined portion of the RF spectrum, the length of time the restriction should be enforced, when to remove (e.g., allow repurposing) and/or modify the restriction, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify when corrective measures, such as selectively allowing or prohibiting repurposing of a RF spectrum, should be taken to improve a user experience, improve radio link conditions in the network, reduce an amount of interference experienced at one or more equipment, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with mitigating and/or reducing an amount of interference within one or more repurposed portions of a RF spectrum) can employ various artificial intelligence-based schemes for carrying out various aspects thereof. For example, a process for determining if a quantity of equipment utilizing a repurposed or overlapping portion of a RF spectrum is sufficient to cause an amount of interference, determined to be detrimental to a user equipment, and when to activate and/or deactivate a BWP of the RF spectrum can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine whether activation and/or deactivation of a BWP should be automatically performed. In the case of selections, for example, attributes can be identification of an amount of interference being experienced by equipment utilizing a repurposed portion (sometimes referred to herein as an overlapping portion) of the RF spectrum, an inferred amount of interference based on the number or quantity of equipment utilizing the repurposed portion of the RF spectrum, and so on.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing equipment feedback associated with the portion of RF spectrum being utilized and respective changes to the portion of RF spectrum utilized by the equipment, by receiving extrinsic information (e.g., one or more signals from the equipment), by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to restrict use of a defined portion of the RF spectrum, when to remove the restriction of the use of the defined portion of the RF spectrum, and so forth. The criteria can include, but is not limited to, historical information, measured amounts of interference, an increase in the amount of equipment utilizing the portion of the RF spectrum and/or expected to use the portion of the RF spectrum, and so forth.

Additionally, or alternatively, an implementation scheme (e.g., a rule, a policy, and so on) can be applied to control and/or regulate usage of the portion of RF spectrum by equipment operating according to different communication protocols, priority of usage by a set of equipment (e.g., the 3G equipment), the ability of the equipment (e.g., the 5G equipment) to use other portions of the spectrum, and so forth. In some implementations, based upon a predefined criterion, the rules-based implementation can automatically and/or dynamically interpret repurposing and/or restricting the repurposing of at least a portion of the RF spectrum. In response thereto, the rule-based implementation can automatically interpret and carry out functions associated with the repurposing of the RF spectrum while mitigating and/or reducing interference experienced by equipment operating in the repurposed portion of the RF spectrum by employing a predefined and/or programmed rule(s) based upon any desired criteria.

In further detail, the system 500 (e.g., the 5G gNB) can continually monitor SINR and perform spectrum analysis (e.g., via the machine learning and reasoning component 502). The system can detect one or more signals from the 3G and/or 4G devices operating nearby in overlapping spectrum. It can also arrange to receive RSRP, RSRQ, and SINR data from the 3G and/or 4G devices. The machine learning and reasoning component 502 can facilitate execution of a process (e.g., executing in the gNB) that analyzes the data. Based, at least in part, on the data, the machine learning and reasoning component 502 can determine when the interference is excessive, or when the interference is expected to become excessive. Depending on the decision, the system 500 (e.g., through its various components) can introduce or remove the BWP configuration. According to some implementations, the machine learning and reasoning component 502 can, depending on the interference in the spectrum, execute a machine learning process that can introduce and/or remove the BWP in a gNB configuration.

According to some implementations, seed data (e.g., a data set) can be utilized as initial input to the model 504 to facilitate the training of the model 504. In an example, if seed data is utilized, the seed data can be obtained from one or more historical data associated with channel state information and/or other information indicative of an amount of interference experienced by equipment in the communication network. However, the disclosed embodiments are not limited to this implementation and seed data is not necessary to facilitate training of the model 504. Instead, the model 504 can be trained on new data received (e.g., the input data 416).

The data (e.g., seed data and/or new data) can be collected and, optionally, labeled with various metadata. For example, the data can be labeled with an indication of the communication protocol being utilized for communication, or other data, such as identification of respective equipment that provided one or more signals included in the input data 416, a time the one or more signals were received, the content of the one or more signals, and so on.

Figure 6:
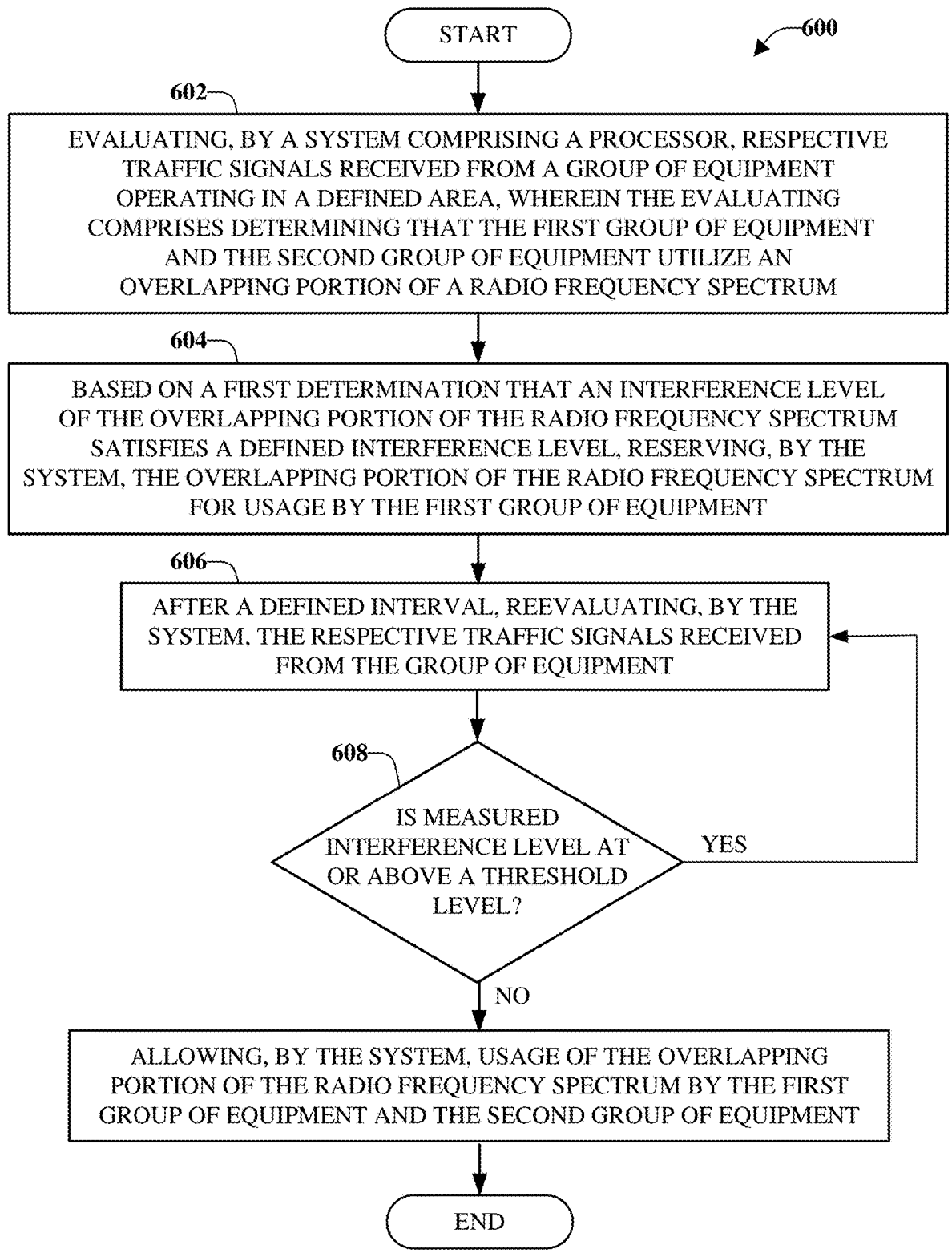
FIG. 6 illustrates an example, non-limiting, computer-implemented method for reserving a portion of a radio frequency spectrum of interest for use by legacy equipment during a repurposing of the spectrum in accordance with one or more embodiments described herein.

FIG. 6 illustrates an example, non-limiting, computer-implemented method 600 for reserving a portion of a RF spectrum of interest for use by legacy equipment during a repurposing of the spectrum in accordance with one or more embodiments described herein. The computer-implemented method 600 can be implemented by a system including a memory and a processor, network equipment including a memory and a processor, a network controller including a memory and a processor, or another computer-implemented device including a memory and a processor.

The computer-implemented method 600 starts, at 602, with evaluating, by a system comprising a processor, respective traffic signals received from a group of equipment operating in a defined area. The defined area can be a geographic area serviced by network equipment. For example, the network equipment can be a 5G gNB and/or a 4G eNB. The group of equipment can include a first group of equipment configured to operate according to a first communication protocol and at least a second group of equipment configured to operate according to a second communication protocol, different from the first communication protocol. According to an implementation, the first communication protocol can be a 3G communication protocol and/or a 4G communication protocol and the second communication protocol can be at least a 5G communication protocol and/or a NR communication protocol. In some implementations, the first group of equipment can be classified as IoT devices and/or IoE devices.

In an example, the evaluation at 602 can include determining that the first group of equipment and the second group of equipment utilize an overlapping portion of a radio frequency spectrum. The radio frequency spectrum can include resource blocks in a frequency-time domain. With reference again to FIG. 2, the overlapping portion of the spectrum can correspond to 0-24 resource blocks of 5G spectrum. However, the disclosed embodiments are not limited to this portion of the spectrum and other portions can be utilized for the overlapping portion.

Based on a first determination that an interference level of the overlapping portion of the radio frequency spectrum satisfies a defined interference level, the computer-implemented method 600 can include reserving, by the system, the overlapping portion of the radio frequency spectrum for usage by the first group of equipment, at 604. Thus, continuing the above example, the 0-24 resource blocks of 5G spectrum can be "Reserved for 3G IoT," as indicated in FIG. 2.

According to some implementations, reserving the overlapping portion can include blocking usage of the overlapping portion of the radio frequency spectrum by the second group of equipment. For example, the blocking can include limiting usage of the radio frequency spectrum by the second group of equipment to a non-overlapping portion of the radio frequency spectrum. In some implementations, reserving the overlapping portion includes temporarily halting a repurposing of the overlapping portion of the radio frequency spectrum. Thus, during the reserving, the second group of equipment is instructed not to utilize the overlapping portion of the radio frequency spectrum.

Further, after a defined interval, the computer-implemented method 600 can include reevaluating, by the system, the respective traffic signals received from the group of equipment. Further, at 608, a determination is made whether a measured interference level is at or above a threshold level. If the determination is that the measured interference level is at or above the threshold level ("YES"), the computer-implemented method 600 returns to 606 and, after another defined interval, the respective traffic signals are reevaluated.

It is to be understood that the evaluation of the measured interference level at 608 and the evaluation of the respective traffic signals at 606 can be recursive. For example, the one or more signals can be evaluated for indications of interference levels until the determination at 608 is that the measured interference level is no longer at or above the threshold level.

Based on the determination at 608 being that the measured interference level is below the threshold level ("NO"), the computer-implemented method 600 continues, at 610, with allowing, by the system, usage of the overlapping portion of the radio frequency spectrum by the first group of equipment and the second group of equipment.

Figure 7:
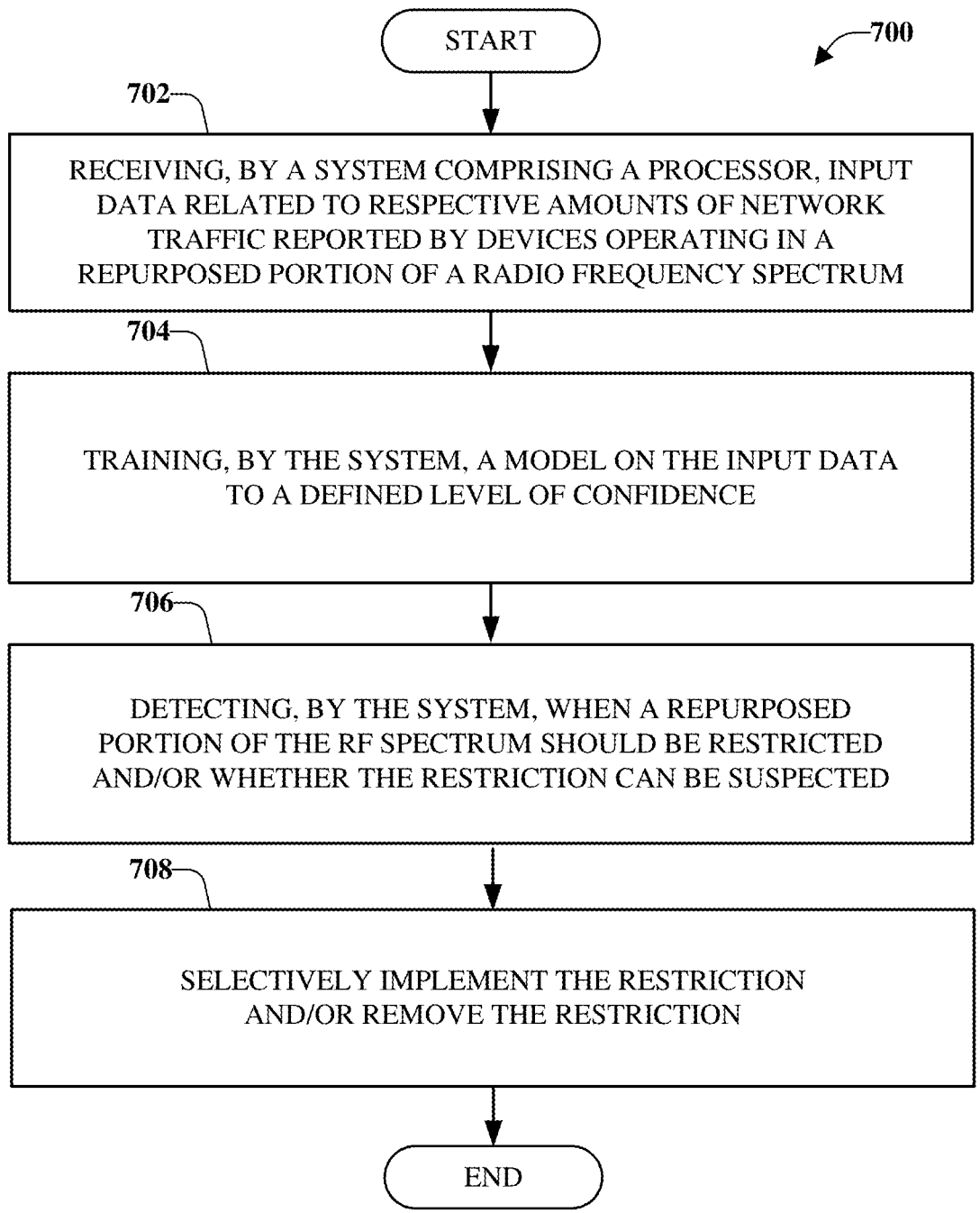
FIG. 7 illustrates an example, non-limiting, computer-implemented method that utilizes artificial intelligence for facilitating interference avoidance at coexistence of cellular radio access technologies in a same channel in accordance with one or more embodiments described herein.

FIG. 7 illustrates an example, non-limiting, computer-implemented method 700 that utilizes artificial intelligence for facilitating interference avoidance at coexistence of cellular radio access technologies in a same channel in accordance with one or more embodiments described herein. The computer-implemented method 700 can be implemented by a system including a memory and a processor, network equipment including a memory and a processor, a network controller including a memory and a processor, or another computer-implemented device including a memory and a processor.

The computer-implemented method 700 starts, at 702 with receiving, by a system comprising a processor, input data related to respective amounts of network traffic reports by devices operating in a repurposed portion of a radio frequency spectrum. The input data can be received over a defined period of time (e.g., days, weeks, months, years, and so on) and/or based on a quantity of input data collected (e.g., hundreds, thousands, tens of thousands, hundreds of thousands, millions, and so on). The quantity of input data should be a sufficient quantity such that appropriate machine learning on the information can be performed to a defined level of confidence. The defined level of confidence can be a percentage of an accuracy level (e.g., 80% accuracy, 90% accuracy, and so on) that is determined to be sufficient to achieve advantages of reduction of interference in a repurposed portion of an RF spectrum as discussed herein.

At 704 of the computer-implemented method 700, the system can train a model on input data that comprises information indicative of a condition of a communication network (e.g., via the machine learning and reasoning component 502). For example, training the model can include training the model to detect, to a defined confidence level, changing conditions associated with an amount of equipment operating within a same portion of a RF spectrum. In an example, training the model can include training the model to identify when an amount of equipment utilizing a same portion of the RF spectrum is causing an excessive amount of interference. In another example, training the model can include training the model on respective indications of interference reports by equipment.

At 706 of the computer-implemented method 700, based on the model data, the system can detect when a repurposed portion of the RF spectrum should be restricted and/or whether the restriction can be suspended. The repurposed portion of the RF spectrum can be restricted to a set of devices and/or the restriction on the repurposed portion of the spectrum can be lifted and, therefore, that portion of the spectrum can be used by two or more sets of equipment, where respective sets of equipment are configured to operate according to different communication protocols. Further, at 708 of the computer-implemented method 700, the system can selectively implement the restriction and/or remove the restriction.

Figure 8:
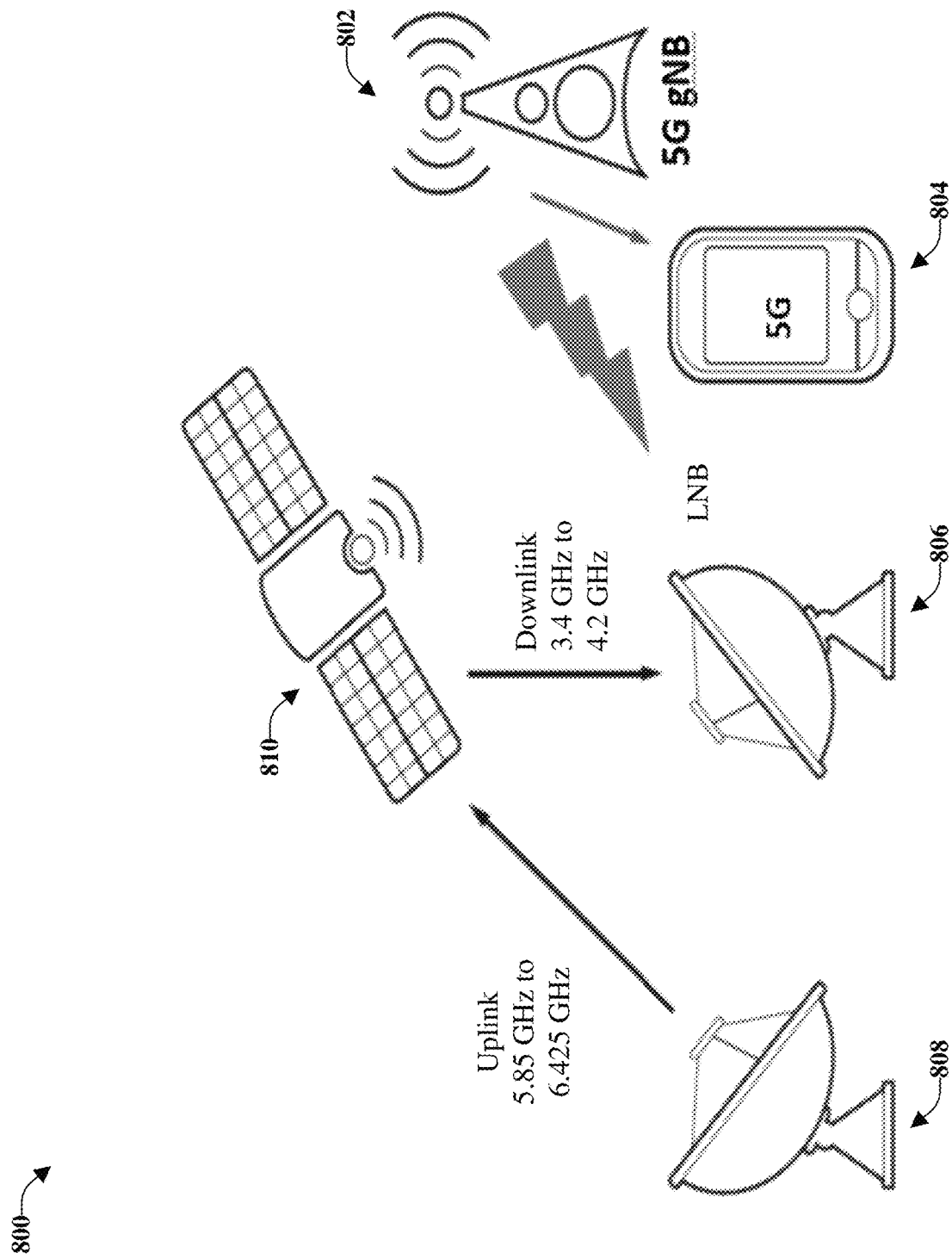
FIG. 8 illustrates a schematic representation of a communications network that comprises a coexistence of fifth-generation communication protocol devices and satellite devices in accordance with one or more embodiments described herein

FIG. 8 illustrates a schematic representation of a communications network 800 that comprises a coexistence of 5G devices and satellite devices in accordance with one or more embodiments described herein. As illustrated network equipment 802 can facilitate communication with one or more 5G devices 804 and one or more satellite devices, illustrated as a first earth station 806, a second earth station 808, and an orbiting station 810.

In accordance with an example, non-limiting implementation, a band, such as 3700 MHz to 3980 MHz can be utilized for 5G deployment, while satellite communication uses 4G LTE with a downlink frequency of between 3.4 GHz and 4.2 GHz. The satellite signal received at the earth stations (e.g., the first earth station 806, the second earth station 808) is usually several orders of magnitude weaker than the cellular signals and can be drowned in noise, if a 5G macro-tower is located in proximity to the earth station. If the overlapping frequency part causing interference to the earth station is known, the technique of Bandwidth Part as discussed herein can be used to block transmission from the 5G tower in that frequency range.

Described herein are systems, methods, articles of manufacture, non-transitory machine-readable medium, and other embodiments or implementations that can facilitate mitigation and/or reduction of interference within a repurposed portions of a RF spectrum through utilization of a BWP feature as discussed herein. For example, as older devices increase their radio power in order to improve SINR, there is the possibility of interferences in which the older devices may also affect adversely the newer devices. Thus, there could be mutual interferences among the devices of different generations. Additionally, the alerts transmitted by simple alarm devices (often of older generations) may be buried in noise and could be lost, causing denial of service.

According to an implementation, the disclosed embodiments can be utilized for a repurposed 5G network and 3G IoT devices (such as alarms) connected to 3G-to-4G converter can have high interferences due to mutual enhancing effects, thereby creating denial of service (DoS) in which alerts cannot be read.

Another use case in which the disclosed embodiments can be utilized is for overlapping C-Band between 5G terrestrial and 4G LTE satellite communication. The downlink signal to the earth stations may be drowned by strong 5G cellular signals.

Thus, as described herein, a BWP feature, introduced in 5G, can be used to keep a portion of spectrum inaccessible to 5G, at least temporarily. This portion of the spectrum can be allocated for 3G IoT devices and/or for downlink satellite communication to the earth station.

According to an implementation, a non-transitory machine-readable medium, comprising executable instructions that, when executed by a processor, facilitate performance of operations. The operations can include evaluating a repurposing of a radio spectrum. An initial provisioning of the provisioning of the radio spectrum allocated a defined portion of the radio spectrum to a first group of equipment and an entirety of the radio spectrum, including the defined portion, to a second group of equipment. The first group of equipment can be configured to operate according to a first communication protocol and the second group of equipment can be configured to operate according to a second communication protocol. Further, the evaluating can include determining an amount of interference at the defined portion of the radio spectrum. The operations also can include, based on a determination that the amount of interference at the defined portion of the radio spectrum exceeds a threshold level, instructing the second group of equipment to discontinue usage of the defined portion of the radio spectrum for signal transmission.

In an example, the operations can also include, after a defined interval, reevaluating the repurposing of the radio spectrum. Further, the operations can include, based on a second determination that the amount of interference at the defined portion of the radio spectrum no longer exceeds the threshold level, resuming the repurposing of the radio spectrum to the initial provisioning.

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 9:
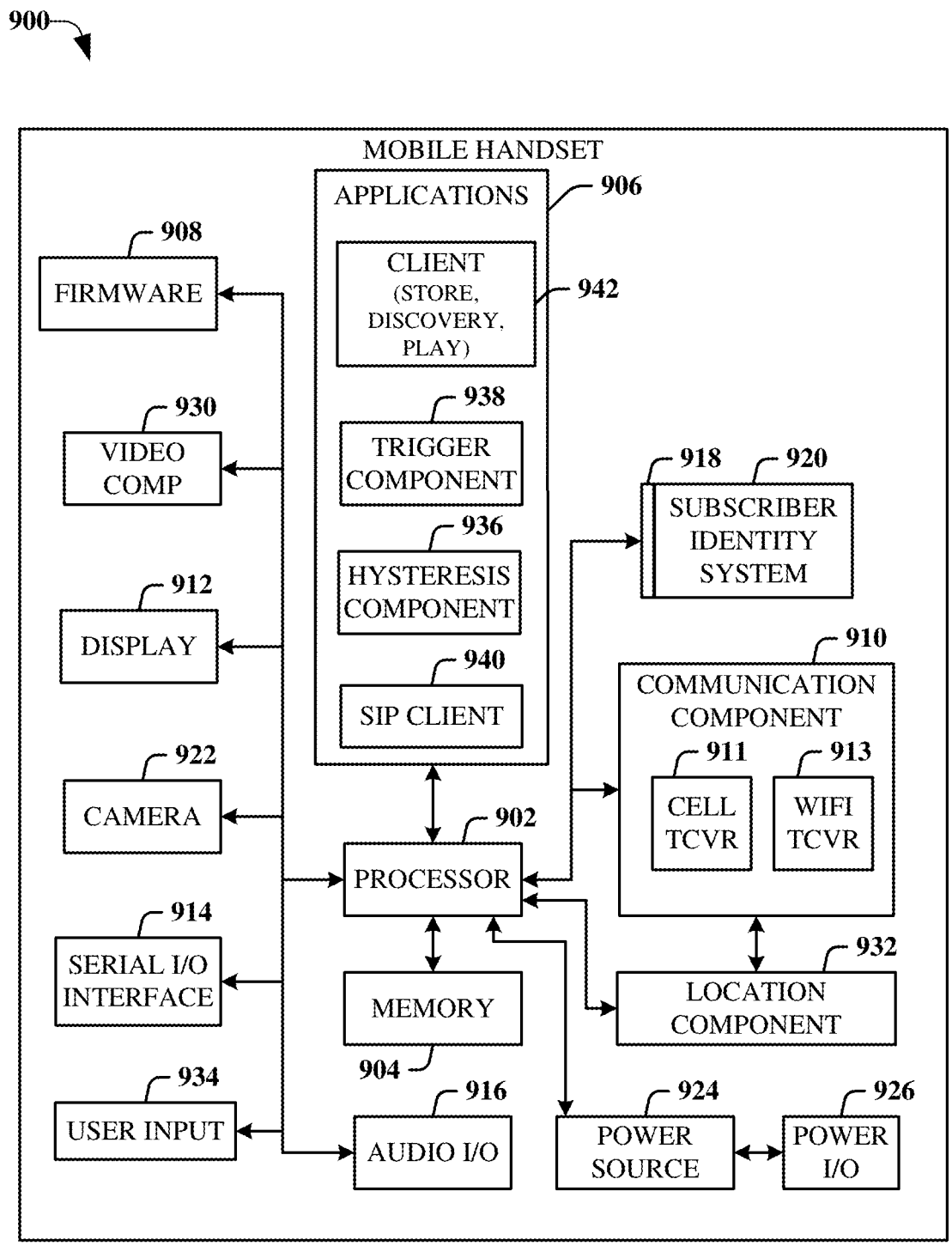
FIG. 9 illustrates an example, non-limiting, block diagram of a handset operable to engage in a system architecture that facilitates wireless communications according to one or more embodiments described herein.

Referring now to FIG. 9, illustrated is an example, non-limiting, block diagram of a handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

Figure 10:
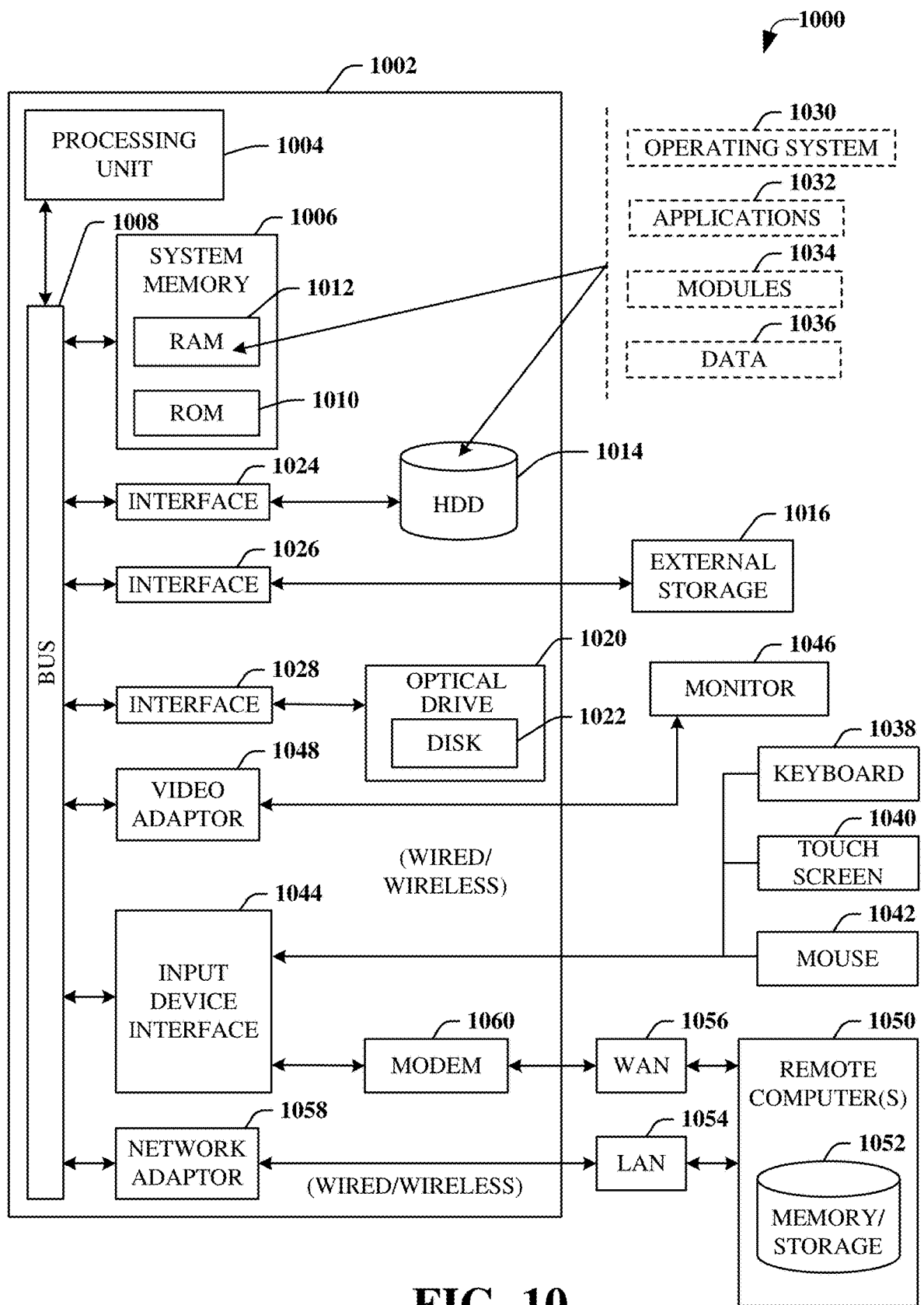
FIG. 10 illustrates an example, non-limiting, block diagram of a computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A Basic Input/Output System (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For example, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
evaluating, by a system comprising a processor, respective network traffic signals received from a group of equipment operating in a defined area, wherein the group of equipment comprises a first group of equipment configured to operate according to a first communication protocol and a second group of equipment configured to operate according to a second communication protocol, different from the first communication protocol, and wherein the evaluating comprises determining that the first group of equipment and the second group of equipment utilize an overlapping portion of a radio frequency spectrum; and based on a determination that an interference level of the overlapping portion of the radio frequency spectrum satisfies a defined interference level, reserving, by the system, the overlapping portion of the radio frequency spectrum for usage by the first group of equipment, wherein the reserving comprises blocking usage of the overlapping portion of the radio frequency spectrum by the second group of equipment, and wherein the blocking comprises limiting usage of the radio frequency spectrum by the second group of equipment to a non-overlapping portion of the radio frequency spectrum.

2. The method of claim 1, wherein the determination is a first determination, and wherein the method further comprises:

after a defined interval, reevaluating, by the system, the respective network traffic signals received from the group of equipment; and based on a second determination that the interference level of the overlapping portion of the radio frequency spectrum no longer satisfies the defined interference level, allowing, by the system, usage of the overlapping portion of the radio frequency spectrum by the first group of equipment and the second group of equipment.

3. The method of claim 1, wherein the evaluating comprises performing a spectrum analysis on the respective network traffic signals.

4. The method of claim 1, wherein the reserving further comprises temporarily halting a repurposing of the overlapping portion of the radio frequency spectrum.

5. The method of claim 4, further comprising:

facilitating, by the system, utilization of machine learning to train a model to identify an opportunity to reprovision the overlapping portion of the radio frequency spectrum, wherein the model is trained to a defined confidence level.

6. The method of claim 1, wherein the radio frequency spectrum comprises resource blocks in a frequency-time domain.

7. The method of claim 1, wherein the first communication protocol is a third generation communication protocol and wherein the second communication protocol is at least a fifth generation communication protocol.

8. The method of claim 1, wherein the first communication protocol is a fourth generation communication protocol, and wherein the second communication protocol is at least a fifth generation communication protocol.

9. The method of claim 1, wherein the first group of equipment is equipment classified as internet of things devices.

10. A system comprising:

a processor; and a memory that stores executable instructions that, when executed by the processor, facilitate performance of operations, the operations comprising:

evaluating respective network traffic signals received from a group of equipment operating in a defined area, wherein the group of equipment comprises a first group of equipment configured to operate according to a first communication protocol and a second group of equipment configured to operate according to a second communication protocol, different from the first communication protocol, and wherein the evaluating comprises determining that the first group of equipment and the second group of equipment utilize an overlapping portion of a radio frequency spectrum; and based on a determination that an interference level of the overlapping portion of the radio frequency spectrum satisfies a defined interference level, reserving the overlapping portion of the radio frequency spectrum for usage by the first group of equipment, wherein the reserving comprises blocking usage of the overlapping portion of the radio frequency spectrum by the second group of equipment, and wherein the blocking comprises limiting usage of the radio frequency spectrum by the second group of equipment to a non-overlapping portion of the radio frequency spectrum.

11. The system of claim 10, wherein the determination is a first determination, and wherein the operations further comprise:

after a defined interval, reevaluating the respective network traffic signals received from the group of equipment; and based on a second determination that the interference level of the overlapping portion of the radio frequency spectrum no longer satisfies the defined interference level, allowing usage of the overlapping portion of the radio frequency spectrum by the first group of equipment and the second group of equipment.

12. The system of claim 10, wherein the evaluating comprises performing a spectrum analysis on the respective network traffic signals.

13. The system of claim 10, wherein the reserving further comprises temporarily halting a repurposing of the overlapping portion of the radio frequency spectrum.

14. The system of claim 13, the operations further comprising:

facilitating utilization of machine learning to train a model to identify an opportunity to reprovision the overlapping portion of the radio frequency spectrum, wherein the model is trained to a defined confidence level.

15. The system of claim 10, wherein the radio frequency spectrum comprises resource blocks in a frequency-time domain.

16. The system of claim 10, wherein the first communication protocol is a third generation communication protocol and wherein the second communication protocol is at least a fifth generation communication protocol.

17. The system of claim 10, wherein the first communication protocol is a fourth generation communication protocol, and wherein the second communication protocol is at least a fifth generation communication protocol.

18. The system of claim 10, wherein the first group of equipment is equipment classified as internet of things devices.

19. A non-transitory machine-readable medium, comprising executable instructions that, when executed by a processor, facilitate performance of operations, the operations comprising:

evaluating respective network traffic signals received from a group of equipment operating in a defined area, wherein the group of equipment comprises a first group of equipment configured to operate according to a first communication protocol and a second group of equipment configured to operate according to a second communication protocol, different from the first communication protocol, and wherein the evaluating comprises determining that the first group of equipment and the second group of equipment utilize an overlapping portion of a radio frequency spectrum; and based on a determination that an interference level of the overlapping portion of the radio frequency spectrum satisfies a defined interference level, reserving the overlapping portion of the radio frequency spectrum for usage by the first group of equipment, wherein the reserving comprises blocking usage of the overlapping portion of the radio frequency spectrum by the second group of equipment, and wherein the blocking comprises limiting usage of the radio frequency spectrum by the second group of equipment to a non-overlapping portion of the radio frequency spectrum.

20. The non-transitory machine-readable medium of claim 19, wherein the determination is a first determination, and wherein the operations further comprise:

after a defined interval, reevaluating the respective network traffic signals received from the group of equipment; and based on a second determination that the interference level of the overlapping portion of the radio frequency spectrum no longer satisfies the defined interference level, allowing usage of the overlapping portion of the radio frequency spectrum by the first group of equipment and the second group of equipment.

* * * * *